(12) United States Patent
Ashworth et al.

(10) Patent No.: US 10,925,115 B2
(45) Date of Patent: *Feb. 16, 2021

(54) SIGNAL BOOSTER WITH COAXIAL CABLE CONNECTIONS

(71) Applicant: WILSON ELECTRONICS, LLC, St. George, UT (US)

(72) Inventors: Christopher Ken Ashworth, Toquerville, UT (US); Patrick Lee Cook, Cedar City, UT (US); Michael James Mouser, Wylie, TX (US)

(73) Assignee: Wilson Electronics, LLC, St. George, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,896

(22) Filed: Nov. 19, 2019

(65) Prior Publication Data

US 2020/0092947 A1 Mar. 19, 2020

Related U.S. Application Data

(63) Continuation of application No. 16/175,664, filed on Oct. 30, 2018, now Pat. No. 10,485,057, which is a (Continued)

(51) Int. Cl.
*H04W 88/04* (2009.01)
*H04B 7/155* (2006.01)
*H01P 1/18* (2006.01)

(52) U.S. Cl.
CPC ........ *H04W 88/04* (2013.01); *H04B 7/15535* (2013.01); *H01P 1/183* (2013.01)

(58) Field of Classification Search
CPC ..... H04W 88/04; H04B 1/15535; H01P 1/183
(Continued)

(56) References Cited

U.S. PATENT DOCUMENTS 4,061,970 A * 12/1977 Magneron ................ H04B 3/10
455/14
4,776,032 A 10/1988 Odate et al.
(Continued)

FOREIGN PATENT DOCUMENTS

| EP | 1525678 B1 | 7/2008 |
| EP | 2605572 A1 | 6/2013 |
| KR | 10-2000-0074034 A | 12/2000 |

OTHER PUBLICATIONS

3GPP2 C.S0011-B; "Recommended Minimum Performance Standards for cdma2000® Spread Spectrum Mobile Stations"; TIA-98-E; (Dec. 13, 2002); Release B, Version 1, Revision E.
(Continued)

*Primary Examiner* — Hai V Nguyen
(74) *Attorney, Agent, or Firm* — Thorpe North & Western

(57) ABSTRACT

Technology for a repeater is disclosed. The repeater can include a first defined connection. The repeater can include a first coaxial cable connector configured to be communicatively coupled to the first defined connection. The repeater can include a repeater unit communicatively coupled to the first defined connection. The repeater can include a controller configured to adjust a gain or output power of the repeater unit that compensates for insertion losses between the first coaxial cable connector and the first defined connection.

20 Claims, 5 Drawing Sheets

Related U.S. Application Data continuation of application No. 15/951,084, filed on Apr. 11, 2018, now Pat. No. 10,512,120.

(60) Provisional application No. 62/484,315, filed on Apr. 11, 2017.

(58) Field of Classification Search
USPC .......................................... 455/14; 333/160
See application file for complete search history.

(56) References Cited

U.S. PATENT DOCUMENTS

| | | | |
|---|---|---|---|
| 5,109,541 A | 4/1992 | Park | |
| 5,130,664 A * | 7/1992 | Pavlic | H03F 3/605 330/55 |
| 5,133,081 A * | 7/1992 | Mayo | H04H 20/06 340/905 |
| 5,303,395 A | 4/1994 | Dayani | |
| 5,321,736 A * | 6/1994 | Beasley | H04B 7/2606 455/11.1 |
| 5,502,715 A * | 3/1996 | Penny | H04B 3/36 370/293 |
| 5,634,191 A * | 5/1997 | Beasley | H04W 52/52 370/279 |
| 5,678,177 A * | 10/1997 | Beasley | H04B 7/15557 370/279 |
| 5,737,687 A | 4/1998 | Martin et al. | |
| 5,777,530 A | 7/1998 | Nakatuka | |
| 5,835,848 A | 11/1998 | Bi et al. | |
| 5,977,835 A * | 11/1999 | Huang | H01P 1/20 330/305 |
| 5,995,851 A * | 11/1999 | Lim | H04B 1/38 343/872 |
| 6,005,884 A | 12/1999 | Cook et al. | |
| 6,104,934 A * | 8/2000 | Patton | H04B 1/18 455/117 |
| 6,205,340 B1 * | 3/2001 | Yandrofski | H04B 1/16 455/117 |
| 6,263,215 B1 * | 7/2001 | Patton | H04B 1/16 455/117 |
| 6,359,714 B1 * | 3/2002 | Imajo | H04B 10/25754 398/178 |
| 6,571,110 B1 * | 5/2003 | Patton | H04B 1/16 455/117 |
| 6,640,111 B1 * | 10/2003 | Shapira | H01Q 1/246 455/562.1 |
| 6,658,263 B1 * | 12/2003 | Ke | H01P 1/213 333/126 |
| 6,704,545 B1 * | 3/2004 | Wala | H04L 51/38 455/16 |
| 6,711,388 B1 | 3/2004 | Neitiniemi | |
| 6,738,597 B1 * | 5/2004 | Jeung | H04B 7/2606 455/11.1 |
| 6,778,845 B2 * | 8/2004 | Kaegebein | H01Q 1/1207 343/790 |
| 6,868,254 B2 * | 3/2005 | Weissman | H04B 7/2606 455/11.1 |
| 6,889,033 B2 | 5/2005 | Bongfeldt | |
| 6,990,313 B1 | 1/2006 | Yarkosky | |
| 6,996,369 B2 * | 2/2006 | Jimenez | H04B 7/15507 455/11.1 |
| 6,996,421 B2 * | 2/2006 | Kaegebein | H01Q 1/1207 343/790 |
| 7,035,587 B1 | 4/2006 | Yarkosky | |
| 7,065,350 B2 * | 6/2006 | Capobianco | H04W 88/04 455/11.1 |
| 7,221,967 B2 | 5/2007 | Van Buren et al. | |
| 7,257,369 B2 * | 8/2007 | Weissman | H04B 7/15535 455/11.1 |
| 7,881,659 B2 * | 2/2011 | Utakouji | H04B 7/155 455/11.1 |
| 7,907,913 B2 * | 3/2011 | Lee | H04L 27/2601 455/69 |
| 7,974,573 B2 | 7/2011 | Dean | |
| 8,175,521 B2 * | 5/2012 | O'Neill | H04B 7/15535 455/7 |
| 8,325,691 B2 * | 12/2012 | Reynolds | H04L 12/189 370/338 |
| 8,428,510 B2 * | 4/2013 | Stratford | H04W 52/52 455/7 |
| 8,478,191 B2 * | 7/2013 | Mohebbi | H04B 7/0802 455/8 |
| 8,638,835 B2 * | 1/2014 | Wang | H04B 7/15578 375/211 |
| 9,065,415 B1 | 6/2015 | Van Buren et al. | |
| 9,130,641 B2 | 9/2015 | Mohebbi | |
| 9,250,139 B2 * | 2/2016 | Tofighi | A61B 5/026 |
| 9,397,743 B2 | 7/2016 | Lotter | |
| 9,813,182 B2 * | 11/2017 | Ji | H04J 14/021 |
| 9,838,882 B1 * | 12/2017 | Yankevich | H04K 3/226 |
| 9,859,678 B2 * | 1/2018 | Middleton | H01S 5/0085 |
| 10,237,749 B2 * | 3/2019 | Yankevich | H04W 48/16 |
| 10,485,057 B2 * | 11/2019 | Ashworth | H04W 88/04 |
| 10,512,120 B2 * | 12/2019 | Ashworth | H04W 88/04 |
| 2001/0046840 A1 * | 11/2001 | Kim | H04B 7/2606 455/7 |
| 2002/0032004 A1 * | 3/2002 | Widrow | H04B 3/36 455/22 |
| 2002/0039885 A1 * | 4/2002 | Weissman | H04B 7/2606 455/20 |
| 2002/0044594 A1 | 4/2002 | Bongfeldt | |
| 2002/0045461 A1 | 4/2002 | Bongfeldt | |
| 2002/0061763 A1 * | 5/2002 | Weissman | H04W 52/52 455/522 |
| 2003/0045230 A1 * | 3/2003 | Weissman | H04B 7/15535 455/11.1 |
| 2003/0123401 A1 | 7/2003 | Dean | |
| 2003/0130013 A1 * | 7/2003 | Kaegebein | H01Q 1/1207 455/562.1 |
| 2004/0038644 A1 * | 2/2004 | Jimenez | H04W 88/02 455/13.3 |
| 2004/0097189 A1 * | 5/2004 | Bongfeldt | H04W 52/10 455/7 |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0192285 A1 * | 9/2004 | Capobianco | H04W 88/04 455/422.1 |
| 2004/0219876 A1 | 11/2004 | Baker et al. | |
| 2004/0235417 A1 | 11/2004 | Dean | |
| 2005/0009566 A1 * | 1/2005 | Kaegebein | H01Q 13/203 455/562.1 |
| 2005/0118949 A1 | 6/2005 | Allen et al. | |
| 2005/0130589 A1 * | 6/2005 | Weissman | H04B 7/2606 455/11.1 |
| 2005/0232178 A1 * | 10/2005 | Cubley | H04B 7/18517 370/315 |
| 2005/0272367 A1 | 12/2005 | Rodgers et al. | |
| 2006/0084379 A1 | 4/2006 | O'Neill | |
| 2006/0094471 A1 * | 5/2006 | Eddy | H01P 1/2086 455/562.1 |
| 2007/0071128 A1 | 3/2007 | Meir et al. | |
| 2007/0188235 A1 | 8/2007 | Dean | |
| 2007/0202920 A1 * | 8/2007 | Eddy | H01P 7/10 455/562.1 |
| 2007/0232228 A1 | 10/2007 | McKay, Sr. et al. | |
| 2008/0013473 A1 * | 1/2008 | Proctor, Jr. | H04W 88/085 370/315 |
| 2008/0069014 A1 * | 3/2008 | Powell | H04L 5/1438 370/278 |
| 2008/0081555 A1 | 4/2008 | Kong et al. | |
| 2008/0096483 A1 | 4/2008 | Van Buren et al. | |
| 2008/0278237 A1 | 11/2008 | Blin | |
| 2009/0141839 A1 * | 6/2009 | Koh | H04W 52/143 375/345 |
| 2010/0054227 A1 * | 3/2010 | Hettstedt | H04W 88/085 370/343 |
| 2010/0080203 A1 * | 4/2010 | Reynolds | H04L 12/189 370/338 |

(56) References Cited

U.S. PATENT DOCUMENTS

| | | | |
|---|---|---|---|
| 2011/0007664 A1* | 1/2011 | Diab | H04L 12/40136 370/254 |
| 2011/0151775 A1 | 6/2011 | Kang et al. | |
| 2011/0237182 A1* | 9/2011 | Stratford | H04W 52/52 455/7 |
| 2011/0275400 A1* | 11/2011 | Timmins | H01Q 1/007 455/517 |
| 2012/0315048 A1* | 12/2012 | Beck | G01S 5/0221 398/98 |
| 2013/0142222 A1* | 6/2013 | Wang | H04B 7/15578 375/211 |
| 2013/0272339 A1* | 10/2013 | Tofighi | A61B 5/026 374/122 |
| 2014/0254392 A1* | 9/2014 | Wolcott | H04W 24/08 370/242 |
| 2015/0011157 A1* | 1/2015 | Terry | H04B 7/15535 455/10 |
| 2015/0029869 A1* | 1/2015 | Wolcott | H04B 3/487 370/242 |
| 2017/0055215 A1* | 2/2017 | Cook | H04W 52/0229 |
| 2018/0115909 A1* | 4/2018 | Yankevich | H04B 17/336 |
| 2018/0295672 A1* | 10/2018 | Ashworth | H04W 88/04 |
| 2018/0323860 A1* | 11/2018 | Bohls | H04W 52/52 |
| 2018/0342779 A1* | 11/2018 | Grassl | H01P 7/04 |
| 2019/0068136 A1* | 2/2019 | Ashworth | H03F 1/52 |
| 2019/0069342 A1* | 2/2019 | Ashworth | H04W 88/04 |

OTHER PUBLICATIONS

ADL5513; "1 MHz to 4 GHz, 80 dB Logarithmic Detector / Controller"; Data Sheet; (2008); 25 pages.

HMC713LP3E; "54 dB, Logarithmic Detector / Controller, 50—8000 MHz"; Data Sheet; (2010); 12 pages.

HMC909LP4E; "RMS Power Detector Sing-Ended, DC—5.8 GHz"; Data Sheet; (2010); 21 pages.

PIC16F873; "28/40-Pin 8-Bit CMOS FLASH Microcontrollers"; Data Sheet; (2001); 218 pages.

International Search Report dated Sep. 12, 2018, in International Application No. PCT/US2018/027188, filed Apr. 11, 2018; 4 pages.

* cited by examiner

SIGNAL BOOSTER WITH COAXIAL CABLE CONNECTIONS

RELATED APPLICATIONS

The present application is a continuation of U.S. patent application Ser. No. 16/175,664, filed Oct. 30, 2018 which is a continuation of U.S. patent application Ser. No. 15/951,084, filed Apr. 11, 2018, which claims priority to U.S. Provisional Patent Application No. 62/484,315, filed Apr. 11, 2017, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
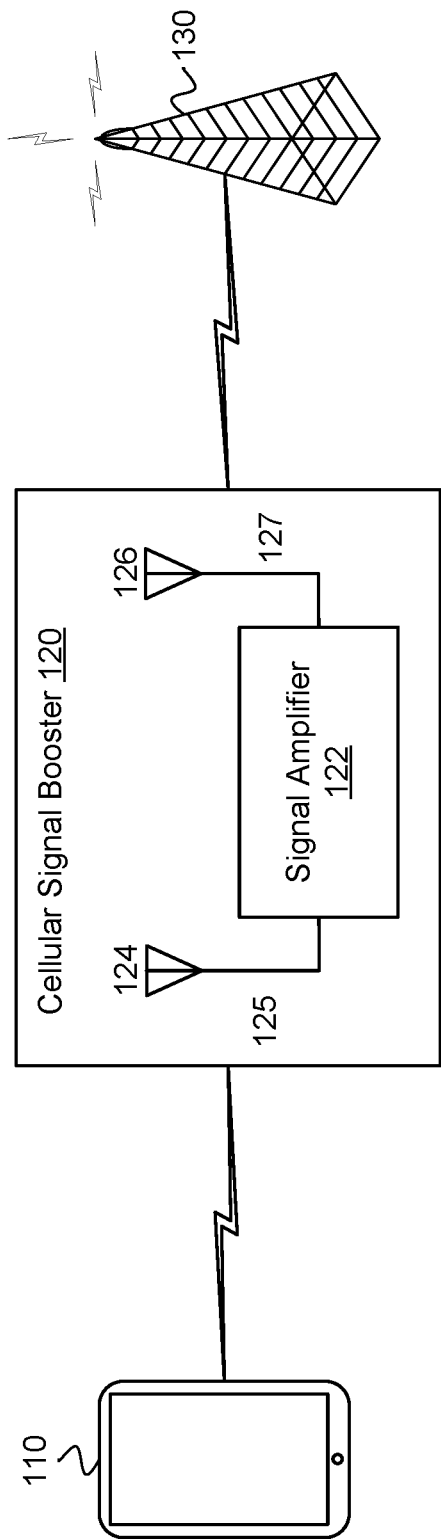
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated node antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 June 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016 October).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
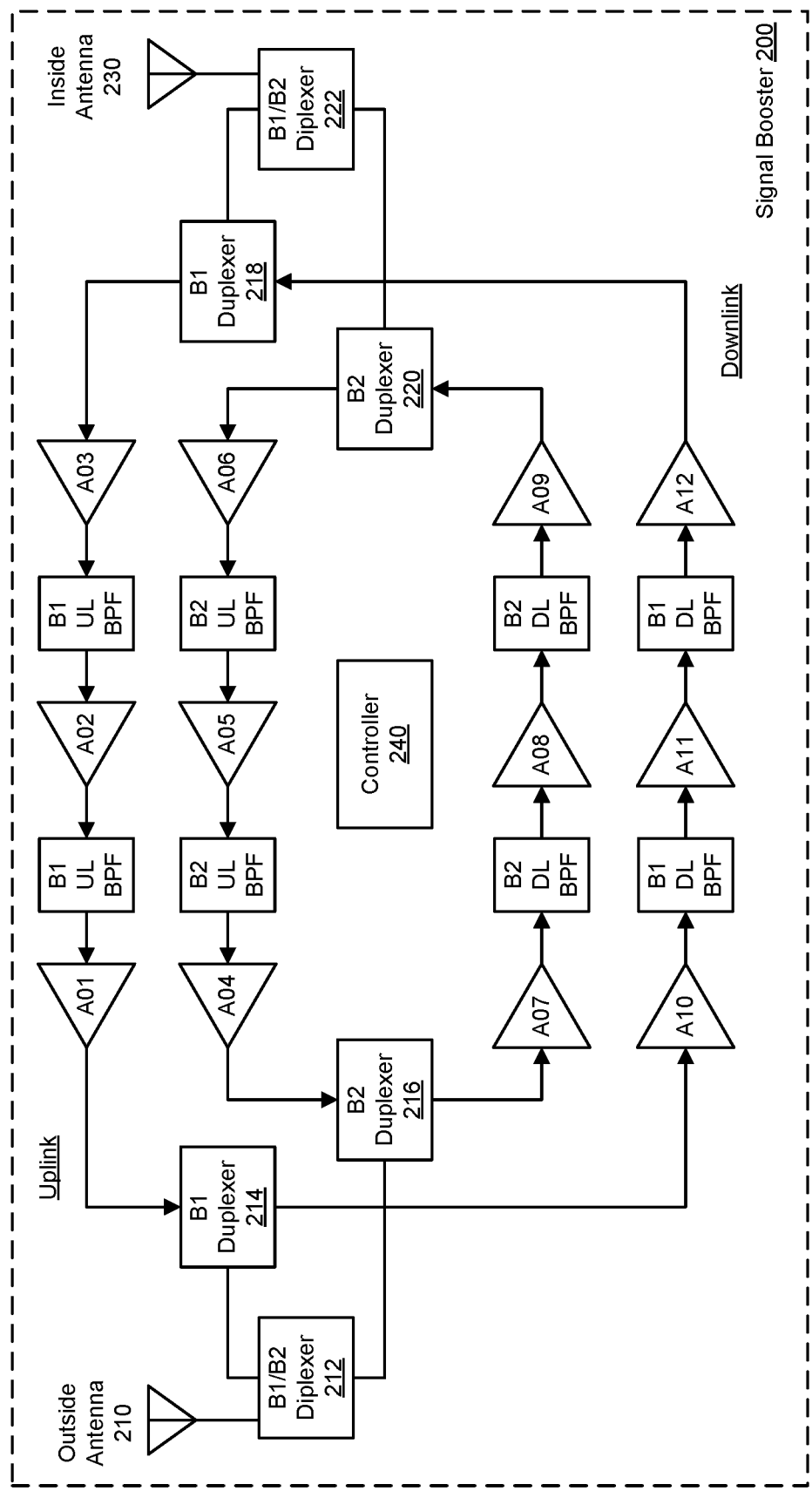
FIG. 2 illustrates a cellular signal booster configured to amplify uplink (UL) and downlink (DL) signals using one or more downlink signal paths and one or more uplink signal paths in accordance with an example.

FIG. 2 illustrates an exemplary bi-directional wireless signal booster 200 configured to amplify uplink (UL) and downlink (DL) signals using a separate signal path for each UL frequency band and DL frequency band and a controller 240. The bi-directional wireless signal booster 200 can be integrated with a GPS module in a signal booster. An outside antenna 210, or an integrated node antenna, can receive a downlink signal. For example, the downlink signal can be received from a base station (not shown). The downlink signal can be provided to a first B1/B2 diplexer 212, wherein B1 represents a first frequency band and B2 represents a second frequency band. The first B1/B2 diplexer 212 can create a B1 downlink signal path and a B2 downlink signal path. Therefore, a downlink signal that is associated with B1 can travel along the B1 downlink signal path to a first B1 duplexer 214, or a downlink signal that is associated with B2 can travel along the B2 downlink signal path to a first B2 duplexer 216. After passing the first B1 duplexer 214, the downlink signal can travel through a series of amplifiers (e.g., A10, A11 and A12) and downlink band pass filters (BPF) to a second B1 duplexer 218. Alternatively, after passing the first B2 duplexer 216, the downlink can travel through a series of amplifiers (e.g., A07, A08 and A09) and downlink band pass filters (BFF) to a second B2 duplexer 220. At this point, the downlink signal (B1 or B2) has been amplified and filtered in accordance with the type of amplifiers and BPFs included in the bi-directional wireless signal booster 200. The downlink signals from the second B1 duplexer 218 or the second B2 duplexer 220, respectively, can be provided to a second B1/B2 diplexer 222. The second B1/B2 diplexer 222 can provide an amplified downlink signal to an inside antenna 230, or an integrated device antenna. The inside antenna 230 can communicate the amplified downlink signal to a wireless device (not shown), such as a mobile phone.

In one example, the inside antenna 230 can receive an uplink (UL) signal from the wireless device. The uplink signal can be provided to the second B1/B2 diplexer 222. The second B1/B2 diplexer 222 can create a B1 uplink signal path and a B2 uplink signal path. Therefore, an uplink signal that is associated with B1 can travel along the B1 uplink signal path to the second B1 duplexer 218, or an uplink signal that is associated with B2 can travel along the B2 uplink signal path to the second B2 duplexer 222. After passing the second B1 duplexer 218, the uplink signal can travel through a series of amplifiers (e.g., A01, A02 and A03) and uplink band pass filters (BPF) to the first B1 duplexer 214. Alternatively, after passing the second B2 duplexer 220, the uplink signal can travel through a series of amplifiers (e.g., A04, A05 and A06) and uplink band pass filters (BPF) to the first B2 duplexer 216. At this point, the uplink signal (B1 or B2) has been amplified and filtered in accordance with the type of amplifiers and BFFs included in the bi-directional wireless signal booster 200. The uplink signals from the first B1 duplexer 214 or the first B2 duplexer 216, respectively, can be provided to the first B1/B2 diplexer 12. The first B1/B2 diplexer 212 can provide an amplified uplink signal to the outside antenna 210. The outside antenna can communicate the amplified uplink signal to the base station.

In one example, the bi-directional wireless signal booster 200 can be a 6-band booster. In other words, the bi-directional wireless signal booster 200 can perform amplification and filtering for downlink and uplink signals having a frequency in bands B1, B2, B3 B4, B5 and/or B6.

In one example, the bi-directional wireless signal booster 200 can use the duplexers to separate the uplink and downlink frequency bands, which are then amplified and filtered separately. A multiple-band cellular signal booster can typically have dedicated radio frequency (RF) amplifiers (gain blocks), RF detectors, variable RF attenuators and RF filters for each uplink and downlink band.

In one configuration, a cellular signal booster can include a first coaxial cable (e.g., an inside coaxial cable) that connects the cellular signal booster to a first antenna (e.g., an inside antenna) and a second coaxial cable (e.g., an outside coaxial cable) that connects the cellular signal booster to a second antenna (e.g., an outside antenna). Losses can occur on the first coaxial cable between the first antenna and the cellular signal booster, and losses can occur on the second coaxial cable between the second antenna and the cellular signal booster. These losses on the first and second coaxial cables can reduce the performance and coverage area of the cellular signal booster. In one example, the first and second coaxial cables attached to the cellular signal booster can be removable for installation purposes.

One option for overcoming coaxial cable losses can be to set up additional cellular signal booster systems in a given area, but this option can increase expense, installation work/time, and a number of antennas (which can be considered unfavorable from an aesthetic point of view).

In one example, a government or regulatory body, such as the Federal Communications Commission (FCC) in the United States, can provide requirements for gain limitations of a booster that are to be measured at the booster's connectors, without taking into account the loss in cables that are connected to the booster's connectors. For example, in previous solutions, the FCC measures the gain and output power of a cellular signal booster between: (1) a first connection point at the first coaxial cable (e.g., the inside coaxial cable) and the cellular signal booster, and (2) a second connection point at the second coaxial cable (e.g., the outside coaxial cable) and the cellular signal booster. Thus, the gain and output power can be measured at both ends of the cellular signal booster without including the first and second coaxial cables in the measurement. However, in previous solutions, the measurement of gain and output power between these the first and second connection points does not allow for optimum gain and output power because since losses in the first and second coaxial cables is not included when determining the gain and output power. In other words, in previous solutions, when the gain and output power is set for the cellular signal booster, it does not account for and compensate for the losses in the first and second coaxial cables.

Taking the losses of connectors and cables into account can complicate the measurements of a booster's gain. For example, if a maximum gain is set and measured at the end of a first cable, connected to a booster, and then a different connector or cable is used, the actual gain of the booster can change, as measured at the end of the different connector or cable. This can make it more difficult to ensure the booster is not producing more gain than allowed by the government entity.

In the present technology, a cellular signal booster can provide for optimum gain and output power by using coaxial cables attached by defined connectors (or proprietary connections). As used herein, a defined cable or a defined connector is a cable and/or connector that is specified for connection to a specific signal booster output and/or input. In addition, the cable and/or connector and/or signal booster input and/or output can be configured such that only the defined cable and/or connector can be connected. A different cable and/or connector will not be configured to be connected.

The use of a defined connector and/or defined cable connected to an input and/or output of a booster allows the booster gain to be set and measured at the end of the defined cable and/or connector, thereby taking into account the loss of the cable and/or connector. Since a different connector and/or cable is not configured to be connected to the booster, then the booster gain that is set for the defined cable and/or connector will not change. This allows a maximum gain requirement of a government or regulatory body for a booster to be met, while also taking the additional loss of cables and connectors into account.

In one embodiment, a defined connector can be a proprietary connector that is configured such that other connectors with cables typically cannot be connected to a port of a booster or repeater. Only a cable attached to the proprietary connector can be attached to the port configured for the proprietary connector. The cable attached to a proprietary connector can be a defined connector.

In another embodiment, a defined cable, with a predetermined amount of loss, can be connected to a booster in such a way that it is not typically disconnectable by an end user. For example, the cable may be soldered to the booster.

Similarly, a defined connector may be attached with a defined cable to a booster in a way that reduces the likelihood of a user removing the cable, such as by soldering a connector, gluing the connector, or otherwise attaching the connector to the booster such that a different booster or cable would not be typically used.

In one example, a first defined connector can be used to connect a first coaxial cable (e.g., an inside coaxial cable) to the cellular signal booster, and a second defined connector can be used to connect a second coaxial cable (e.g., an outside coaxial cable) to the cellular signal booster. The first coaxial cable (e.g., the inside coaxial cable) can be connected to a first antenna (e.g., an inside antenna) and the second coaxial cable (e.g., the outside coaxial cable) can be connected to a second antenna (e.g., an outside antenna).

In the present technology, based on the first and second defined connectors, the gain and output power of the cellular signal booster can be measured between: (1) a connection point at the first coaxial cable (e.g., the inside coaxial cable) and the first antenna (e.g., the inside antenna), and (2) a connection point at the second coaxial cable (e.g., the outside coaxial cable) and the second antenna (e.g., the outside antenna). In this example, the gain and output power can be measured at both ends of the cellular signal booster and include the first and second coaxial cables in the measurement. As a result, the measurement of gain and output power between the first and second connection points can allow for optimum gain and output power because losses in the first and second coaxial cables are accounted for when determining the gain and output power. In other words, in this example, the losses in the first and second coaxial cables can be considered and compensated for when setting the gain and output power for the cellular signal booster. The ability to incorporate coaxial cable losses can allow for higher gain and improve overall performance, while still protecting a base station.

In one example, the defined connectors (or defined connections) can be used to connect the coaxial cables to the cellular signal booster. The defined connectors can be configured for a predetermined length of coaxial cable. In other words, different defined connectors can be configured for different lengths of coaxial cables. The defined connectors can include proprietary or non-proprietary connectors. The defined connectors can utilize a non-standard diameter and/or a non-standard threading gauge. In one example, a diameter and/or threading gauge in a standard connector (e.g., an 'N-type' connector) can be modified, thereby creating a defined connector with a non-standard diameter and/or a non-standard threading gauge. By configuring the defined connectors for predetermined lengths of coaxial cables, a manufacturer can prevent coaxial cables with shorter lengths from being attached to the cellular signal booster (i.e., prevent a user from replacing the coaxial cable that comes with the cellular signal booster with a shorter length coaxial cable). These shorter length coaxial cables could possibly violate FCC rules by changing an effective system gain or power of the cellular signal booster. If the coaxial cables have shorter lengths than what is required by the cellular signal booster, then the gain and output power of the cellular signal booster can be higher than a standard set by the FCC. Therefore, the defined connectors can be utilized to enable measurements to be taken that account for coaxial cable losses, while preventing users for modifying the coaxial cable lengths and possibly violating FCC rules. The defined connectors can be designed to prevent the users from modifying the coaxial cable lengths.

In one example, a maximum gain value can depend on a type of cellular signal booster. For example, indoor boosters can have a gain of approximately 72 decibels (dB), while mobile boosters can have a gain of approximately 55 dB. The maximum gain value can vary by frequency and can be calculated by a formula dependent on a mid-band uplink frequency. These maximum gain values do not take into account the loss in the coaxial cables. Therefore, by incorporating the coaxial cable losses, these maximum gain values can be adjusted to more accurately reflect an optimal gain value for the cellular signal booster.

In one example, the usage of the defined connectors can effectively extend the cellular signal booster ports to the ends of the coaxial cables, which can allow the cellular signal booster to comply with FCC regulatory limits without extra control information or wires other than a normal signal flow of booster amplifiers. During certification, testing measurements can be conducted at coaxial connector ports in the cellular signal booster. For example, the coaxial connector ports can include a first connection point at the first coaxial cable (e.g., the inside coaxial cable) and the first antenna (e.g., the inside antenna), and a second connection point at the second coaxial cable (e.g., the outside coaxial cable) and the second antenna (e.g., the outside antenna). In this example, the gain and output power of the cellular signal booster can be designed to make up for the coaxial cable losses. This design can be in compliance with regulatory bodies, such as the FCC, which can allow manufacturers of such cellular signal boosters a significant advantage over competitors that do not produce cellular signal boosters that account for coaxial cable losses.

Figure 3:
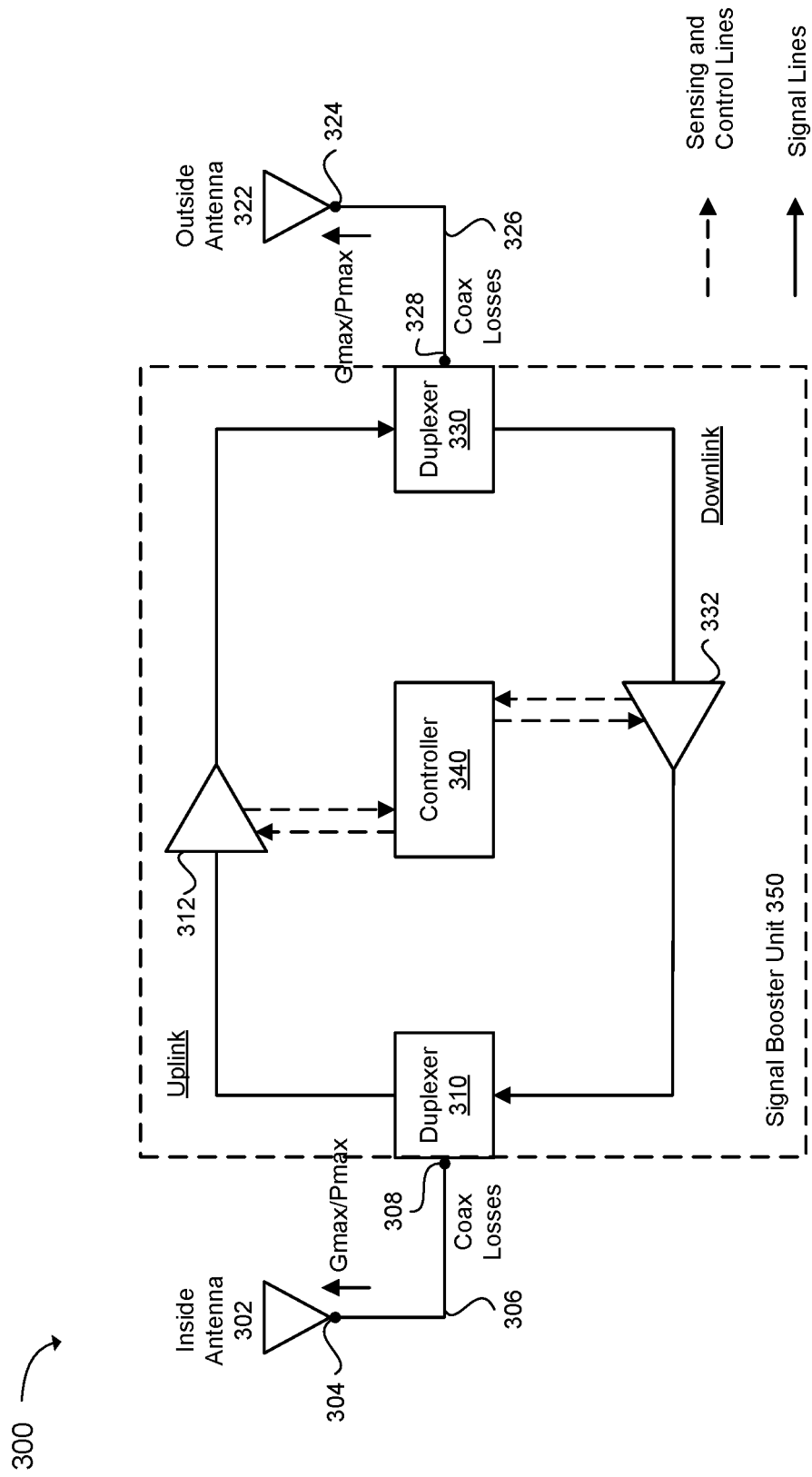
FIG. 3 illustrates a signal booster with coaxial cables that are connected using defined connectors in accordance with an example.

FIG. 3 illustrates an exemplary signal booster 300 (or repeater) with coaxial cables 306, 326 that are connected using defined connectors 308, 328. The signal booster 300 can be a cellular signal booster. The signal booster 300 can include a first coaxial cable 306 with a first defined connector 308. The signal booster 300 can include a second coaxial cable 326 with a second defined connector 328. The signal booster 300 can include a signal booster unit 350 (or repeater unit) communicatively coupled to the first coaxial cable 306 via the first defined connector 308 and the second coaxial cable 326 via the second defined connector 328.

In one example, the signal booster 300 can include a first antenna 302 (e.g., an inside antenna) communicatively coupled to the first coaxial cable 306 via a first coaxial cable connector 304. The first coaxial cable connector 304 can be a defined connector or a non-defined connector. The signal booster 300 can include a second antenna 322 (e.g., an outside antenna) communicatively coupled to the second coaxial cable 326 via a second coaxial cable connector 324. The second coaxial cable connector 324 can be a defined connector or a non-defined connector.

In one configuration, the signal booster 300 can include a controller 340. The controller 340 can adjust a gain and output power of the signal booster unit 350 that accounts for losses on the first coaxial cable 306 and losses on the second coaxial cable 326. The controller 340 can adjust the gain and output power of the signal booster unit 350 based on a gain and output power measurement that considers the first coaxial cable 306, the signal booster unit 350 and the second coaxial cable 326.

More specifically, the controller 340 can adjust the gain and output power of the signal booster unit 350 based on a gain and output power measurement between: the first coaxial cable connector 304 communicatively coupling the first antenna 302 and the first coaxial cable 306, and the second coaxial cable connector 324 communicatively coupling the second antenna 322 and the second coaxial cable 326, thereby accounting for the losses on the first coaxial cable 306 and the losses on the second coaxial cable 326 when adjusting the gain and output power of the signal booster unit 350. In other words, a first measurement value of gain and output power for the first coaxial cable connector 304 and a second measurement value of gain and output power for the second coaxial cable connector 324 can enable the controller 340 to adjust the gain and output power of the signal booster unit 350 while accounting for the losses on the first and second coaxial cables 306, 326.

In one example, first defined connector 308 can be preconfigured based on a length of the first coaxial cable 306, and the second defined connector 328 can be preconfigured based on a length of the second coaxial cable 326. In other words, the first defined connector 308 can be specifically configured for the first coaxial cable 306 (with a given length) and the second defined connector 328 can be specifically configured for the second coaxial cable 326 (with a given length). The first defined connector 308 can have a non-standard diameter or a non-standard threading gauge, and the second defined connector 328 can have a non-standard diameter or a non-standard threading gauge.

In one configuration, the controller 340 can determine an optimum gain and output power of the signal booster unit 350 depending on a length of the first coaxial cable 306 and a length of the second coaxial cable 326. The length of the first coaxial cable 306 and the length of the second coaxial cable 326 can affect losses on the first coaxial cable 306 and the second coaxial cable 326, respectively. The first defined connector 308 prevents a user from modifying the length of the first coaxial cable 306 and the second defined connector 328 prevents a user from modifying the length of the second coaxial cable 326. Therefore, gain and output power measurements taken for the signal booster unit 350 with the first and second coaxial cables 306, 326 having given lengths (which cannot be changed) can enable the controller 340 to determine the optimum gain and output power for the signal booster unit 350.

In one example, a consumer signal booster can be constrained to transmitting a maximum amount of gain (Gmax) and a maximum amount of output power (Pmax), as defined in the FCC rules. The value for Pmax can be the same for all uplink bands (e.g., 30 dBm) and downlink bands (e.g., 17 dBm) at a booster connector. The value for Gmax can vary by frequency for fixed signal boosters and can be calculated by the formula Gmax=6.5 dB+20*log(f), where f indicates a mid-band uplink frequency. In one example, according to the FCC rules, a mobile booster maximum gain shall not exceed: 15 dB when directly connected (e.g., signal boosters with a physical connection to a subscriber device), 23 dB when using direct contact coupling (e.g., cradle-type boosters), or 50 dB when using an inside antenna (e.g., inside a vehicle). According to the FCC rules, these values may not be exceeded, and losses in coaxial cables can significantly decrease a coverage area in these scenarios.

In one example, these losses in coaxial cables can be manually measured, and then a gain and output power can be manually set by a user (e.g., an installer of the signal booster). However, the FCC rules dictate that consumer signal boosters cannot be manually adjusted by the user to prevent operation outside of maximum gain and output power levels. In other words, the FCC rules prohibit user intervention so that signal boosters are not operated outside of predetermined gain and output power limits. Therefore, these adjustments can be performed automatically using the controller 340. In other words, the controller 340 can determine a level of gain and output power for optimal operation of the signal booster. The controller 340 can utilize gain and output power measurements (or test measurements) taken at the ends of the coaxial cables 306, 326 (which have lengths that cannot be adjusted due to the defined connectors 308, 328), and the controller 340 can control amplification in the signal booster unit 350 to make up for losses in the coaxial cables 306, 326, thereby increasing the coverage area of the signal booster 300.

In one example, the first antenna 302 can communicate with a mobile device (not shown), and the second antenna 322 can communicate with a base station (not shown).

In one configuration, the signal booster unit 350 can be utilized to amplify and filter signals. The signals can be uplink signals and/or downlink signals. The signal booster unit 350 can include a first duplexer 310 communicatively coupled to the first coaxial cable 306 via the first defined connector 308. The signal booster unit 350 can include a second duplexer 330 communicatively coupled to the second coaxial cable 326 via the second defined connector 328. The signal booster unit 350 can include one or more downlink signal paths for amplification and filtering of downlink signals, and one or more uplink signal paths for amplification and filtering of uplink signals. For example, an uplink path between the first duplexer 310 and the second duplexer 330 in the signal booster unit 350 can include a first amplifier 312, and a downlink path between the first duplexer 310 and the second duplexer 330 in the signal booster unit 350 can include a second amplifier 332. The first and second amplifiers 312, 332 can communicate with the controller 340 in the signal booster 300 over sensing and control lines.

As an example, an uplink signal can be received at the first antenna 302 from a mobile device (not shown). The uplink signal can travel through the first coaxial cable 306 and be provided to the first duplexer 310. The uplink signal can be directed to an uplink signal path in the signal booster unit 350. The uplink signal can be amplified using the first amplifier 312, and then be provided to the second duplexer 330. The uplink signal can travel through the second coaxial cable 326 and be provided to the second antenna 322. The second antenna 322 can transmit the uplink signal to a base station (not shown).

As another example, a downlink signal can be received at the second antenna 322 from the base station (not shown). The downlink signal can travel through the second coaxial cable 326 and be provided to the second duplexer 330. The downlink signal can be directed to a downlink signal path in the signal booster unit 350. The downlink signal can be amplified using the second amplifier 332, and then be provided to the first duplexer 310. The downlink signal can travel through the first coaxial cable 306 and be provided to the first antenna 302. The first antenna 302 can transmit the downlink signal to the mobile device (not shown).

In one configuration, a repeater can include a first coaxial cable with a first defined connection and a second coaxial cable with a second defined connection. The repeater can include a repeater unit communicatively coupled to the first coaxial cable via the first defined connection, and the repeater unit can be communicatively coupled to the second coaxial cable via the second defined connection. The repeater can include a controller configured to adjust a gain or output power of the repeater unit that accounts for known losses on the first coaxial cable and known losses on the second coaxial cable. The controller can adjust the gain or output power of the repeater unit to meet a network protection or government standard.

In one configuration, the repeater can include a first antenna communicatively coupled to the first coaxial cable via a first coaxial cable connection, and a second antenna communicatively coupled to the second coaxial cable via a second coaxial cable connection.

In one configuration, the controller can adjust the gain or output power of the repeater unit based on a gain or output power measurement between: a first coaxial cable connector communicatively coupling a first antenna and the first coaxial cable, and a second coaxial cable connector communicatively coupling a second antenna and the second coaxial cable, thereby accounting for the known losses on the first coaxial cable and the known losses on the second coaxial cable when adjusting the gain or output power of the repeater unit. Thus, the controller can adjust the gain or output power of the repeater unit based on a system gain or received power that considers the first coaxial cable, the repeater unit and the second coaxial cable.

In one configuration, the controller can determine an optimum gain or output power of the repeater unit depending on: a known insertion loss associated with the first coaxial cable and the second coaxial cable, or a known length and type associated with the first coaxial cable and the second coaxial cable.

In one configuration, the first defined connection can include a first defined connector that is preconfigured based on: an insertion loss of the first coaxial cable, or a length and type of the first coaxial cable. Similarly, the second defined connection can include a second defined connector that is preconfigured based on: an insertion loss of the first coaxial cable, or a length and type of the second coaxial cable. Furthermore, the first defined connection and the second defined connection can include defined connectors with non-standard diameters or non-standard threading gauges or reverse/non-standard polarity. In another configuration, the first defined connection and the second defined connection include defined connectors that are included within the repeater unit and inaccessible to a user, or the first coaxial cable and the second coaxial cable are included within the repeater unit and inaccessible to the user.

In one configuration, a repeater can include a repeater unit having a first port and a second port. The first port can be connected only with a first selected coaxial cable, and the first selected coaxial cable can have a first coaxial connector operable to connect with the first port and a second coaxial connector. The second port can be connected only with a second selected coaxial cable, and the second selected coaxial cable can have a first coaxial connector operable to connect with the second port and a second coaxial connector. The repeater can be configured to have a system gain or output power based on known losses on the first selected coaxial cable and/or the second selected coaxial cable. In a more specific example, the repeater can have the system gain or output power based on known losses between the second coaxial connector of the first selected coaxial cable and the second coaxial connector of the second selected coaxial cable to enable a loss of the first selected coaxial cable and a loss of the second selected coaxial cable to be accounted for in the system gain. In one configuration, the system gain can be based on the known losses between the second coaxial connector of the first selected coaxial cable and the second coaxial connector of the second selected coaxial cable according to a requirement of a regulatory body for a cellular consumer signal booster. In addition, the repeater can have the system gain set depending on a length of the first selected coaxial cable and a length of the second selected coaxial cable.

In one configuration, a repeater can include a repeater unit having a first port and a second port, a first coaxial cable fixedly connected with the first port, and a second coaxial cable fixedly connected with the second port. A gain or output power of the repeater can account for known losses on the first coaxial cable and known losses on the second coaxial cable. The gain or output power of the repeater can be adjusted based on a gain or output power measurement that considers the first coaxial cable, the repeater unit and the second coaxial cable. The gain or output power of the repeater unit can be adjusted depending on a length of the first coaxial cable and a length of the second coaxial cable.

In one configuration, the repeater can include a circuit that checks for an expected minimum return loss or insertion loss on a donor unit server port. When the expected minimum return loss is not present, then the repeater can shut down because one or more coaxial cables in the repeater may have been modified. Therefore, the circuit can function to ensure that the repeater is not intentionally modified (e.g., lengths of the coaxial cables are not intentionally modified), thereby providing an extra layer of security for the repeater.

Figure 4:
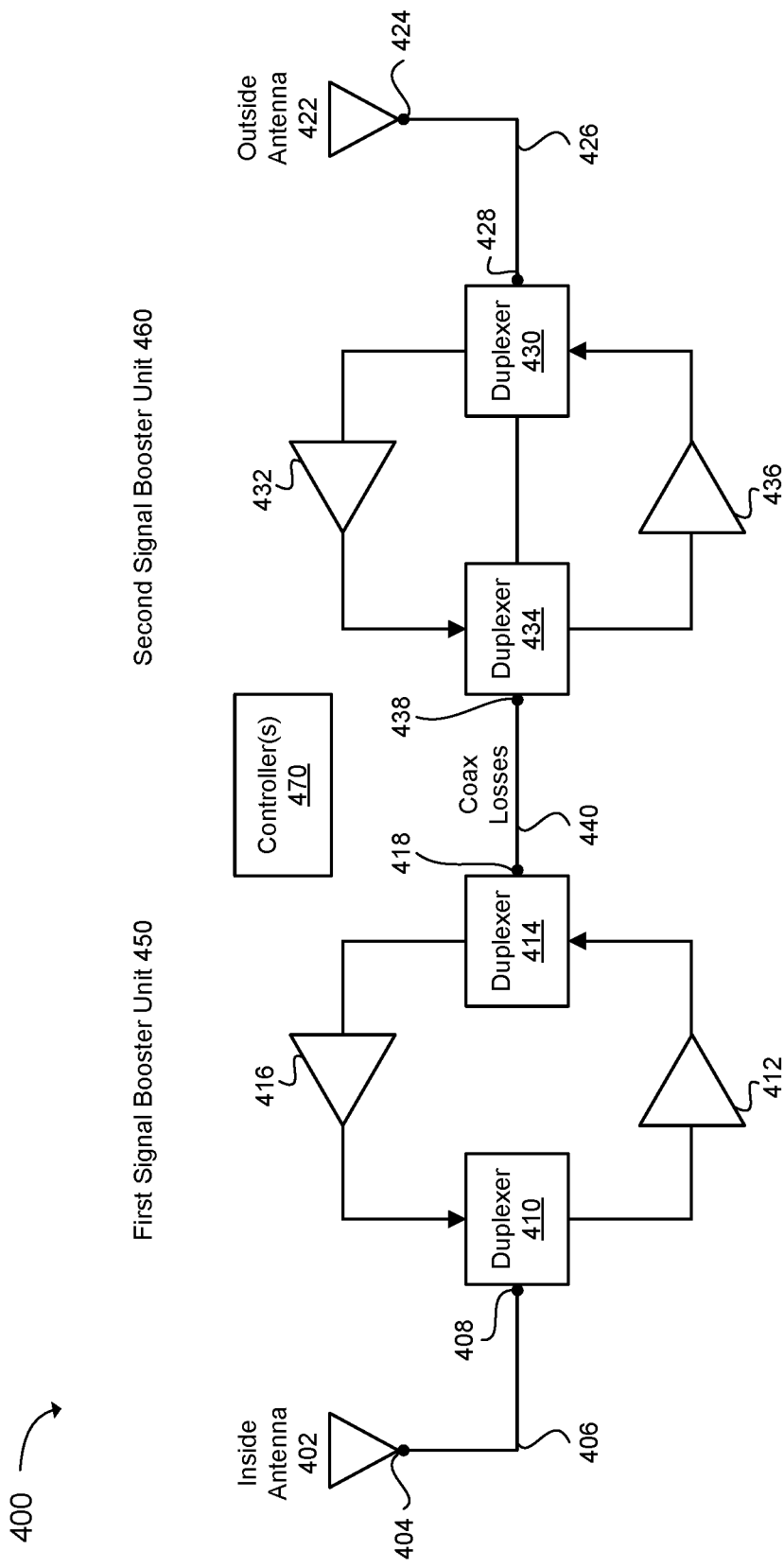
FIG. 4 illustrates a signal booster with multiple signal booster units and coaxial cables that are connected using defined connectors in accordance with an example.

FIG. 4 illustrates an exemplary signal booster 400 with multiple signal booster units and coaxial cables that are connected using defined connectors. The signal booster 400 can include a first signal booster unit 450 and a second signal booster unit 460. The first signal booster unit 450 can include a first defined connector 418 and the second signal booster unit 460 can include a second defined connector 438. A coaxial cable 440 can communicatively couple the first signal booster unit 450 and the second signal booster unit 460 via the first defined connector 418 and the second defined connector 438.

In one example, the first signal booster unit 450 can include a first coaxial cable connector 408. The first coaxial cable connector 408 can be a defined connector or a non-defined connector. The first coaxial cable connector 408 can be attached to a first antenna coaxial cable 406, and the first antenna coaxial cable 406 can be connected to a third coaxial cable connector 404. The third coaxial cable connector 404 can be a defined connector or a non-defined connector. In one example, a first antenna 402 (e.g., an inside antenna) can be communicatively coupled to the first signal booster unit 450 via the first and third coaxial cable connectors 408, 404 and over the first antenna coaxial cable 406.

In one example, the second signal booster unit 460 can include a second coaxial cable connector 428. The second coaxial cable connector 428 can be a defined connector or a non-defined connector. The second coaxial cable connector 428 can be attached to a second antenna coaxial cable 426, and the second antenna coaxial cable 426 can be connected to a fourth coaxial cable connector 424. The fourth coaxial cable connector 424 can be a defined connector or a non-defined connector. In one example, a second antenna 422 (e.g., an outside antenna) can be communicatively coupled to the second signal booster unit 460 via the second and fourth coaxial cable connectors 428, 424 and over the second antenna coaxial cable 426.

In one configuration, a controller 470 in the signal booster 400 can adjust a gain and output power of the signal booster 400 that accounts for losses on the coaxial cable 440 that communicatively couples the first signal booster unit 450 and the second signal booster unit 460. More specifically, the controller 470 can adjust the gain and output power of the signal booster 400 based on a gain and output power measurement between: the first coaxial cable connector 408 communicatively coupling the first antenna 402 and the first signal booster unit 450, and the second coaxial cable connector 428 communicatively coupling the second antenna 422 and the second signal booster unit 460, thereby accounting for the losses on the coaxial cable 440 that communicatively couples the first signal booster unit 450 and the second signal booster unit 460 when adjusting the gain and output power of the signal booster 400. In this configuration, the controller 470 can adjust the gain and output power of the signal booster 400 based on a gain and output power measurement that considers the first signal booster unit 450, the coaxial cable 440 and the second signal booster unit 460.

In one configuration, the first signal booster unit 450 can be an in-line amplification unit and the second signal booster unit 460 can be a main amplification unit. The coaxial cable 440 can be a middle coaxial cable between the in-line amplification unit and the main amplification unit, which can be attached using defined connectors. The usage of the defined connectors can be useful in guaranteeing a certain amount of coaxial cable loss between the in-line amplification unit and the main amplification unit. In this configuration, the first antenna coaxial cable 406 can be an inside coaxial cable and the second antenna coaxial cable 426 can be an outside coaxial cable, and a gain and output power can be measured between: (1) a connection point between the in-line amplification unit and the inside coaxial cable, and (2) a connection point between the main amplification unit and the outside coaxial cable. As a result, losses from the middle coaxial cable can be included when setting a gain and the output power. Therefore, the in-line amplification unit, the main amplification unit, and the middle coaxial cable in between the in-line amplification unit and the main amplification unit can be certified as a single consumer signal booster system.

In one configuration, the controller 470 in the signal booster 400 can adjust a gain and output power of the signal booster 400 that accounts for losses on the first antenna coaxial cable 406, the coaxial cable 440 that communicatively couples the first signal booster unit 450 and the second signal booster unit 460, and the second antenna coaxial cable 426. More specifically, the controller 470 can adjust the gain and output power of the signal booster 400 based on a gain and output power measurement between: the third coaxial cable connector 404 that communicatively couples the first antenna 402 with the first antenna coaxial cable 406, and the fourth coaxial cable connector 424 that communicatively couples the second antenna 422 with the second antenna coaxial cable 426, thereby accounting for losses on: the first antenna coaxial cable 406, the coaxial cable 440 that communicatively couples the first signal booster unit 450 and the second signal booster unit 460, and the second antenna coaxial cable 426, when adjusting the gain and output power of the signal booster 400.

In one configuration, the first antenna coaxial cable 406 can be an inside coaxial cable and the first coaxial cable connector 408 can be a defined connector, and the second antenna coaxial cable 426 can be an outside coaxial cable and the second coaxial cable connector 428 can be a defined connector. In this configuration, a gain and output power can be measured between: (1) a connection point between the inside coaxial cable and an inside antenna, and (2) a connection point between the outside coaxial cable and an outside antenna. Thus, the losses from each of the coaxial cables can be included when setting a gain and output power.

In one example, the first defined connector 418 can be preconfigured based on a length of the coaxial cable 440, and the second defined connector 438 can be preconfigured based on the length of the coaxial cable 440. In another example, the first defined connector 418 can have a non-standard diameter or a non-standard threading gauge, and the second defined connector 438 can have a non-standard diameter or a non-standard threading gauge.

In one example, the first signal booster unit 450 can include one or more amplifiers and one or more filters for amplification and filtering of signals. For example, the first signal booster 450 can include a first duplexer 410, a first amplifier 412, a second duplexer 414 and a second amplifier 416. The second signal booster unit 460 can include one or more amplifiers and one or more filters for amplification and filtering of signals. For example, the second signal booster 460 can include a third duplexer 434, a third amplifier 436, a fourth duplexer 430 and a fourth amplifier 432.

In one configuration, a signal boosting system can include a first signal booster unit with a first defined connection, a second signal booster unit with a second defined connection, a coaxial cable that communicatively couples the first signal booster unit and the second signal booster unit via the first defined connection and the second defined connection, and at least one controller configured to adjust a gain or output power of the signal boosting system that accounts for known losses on the coaxial cable that communicatively couples the first signal booster unit and the second signal booster unit.

In one configuration, the signal boosting system can include a first antenna communicatively coupled to the first signal booster unit via a first coaxial cable connection over a first antenna coaxial cable, and a second antenna communicatively coupled to the second signal booster unit via a second coaxial cable connection over a second antenna coaxial cable.

In one configuration, the controller can adjust the gain or output power of the signal boosting system based on a gain and or power measurement between: a first coaxial cable connector communicatively coupling a first antenna and the first signal booster unit, and a second coaxial cable connector communicatively coupling a second antenna and the second signal booster unit, thereby accounting for the known losses on the coaxial cable that communicatively couples the first signal booster unit and the second signal booster unit when adjusting the gain or output power of the signal booster.

In one configuration, the controller can adjust the gain or output power of the signal boosting system between the first signal booster unit and the second signal booster unit, thereby accounting for system performance of: the first signal booster unit, the second signal booster unit, and the coaxial cable that communicatively couples the first signal booster unit and the second signal booster unit, when adjusting the gain or output power of the signal boosting system.

In one configuration, the at least one controller can include a first controller configured to adjust a gain or output power for the first signal booster unit and a second controller configured to adjust a gain or output power for the second signal booster unit.

Figure 5:
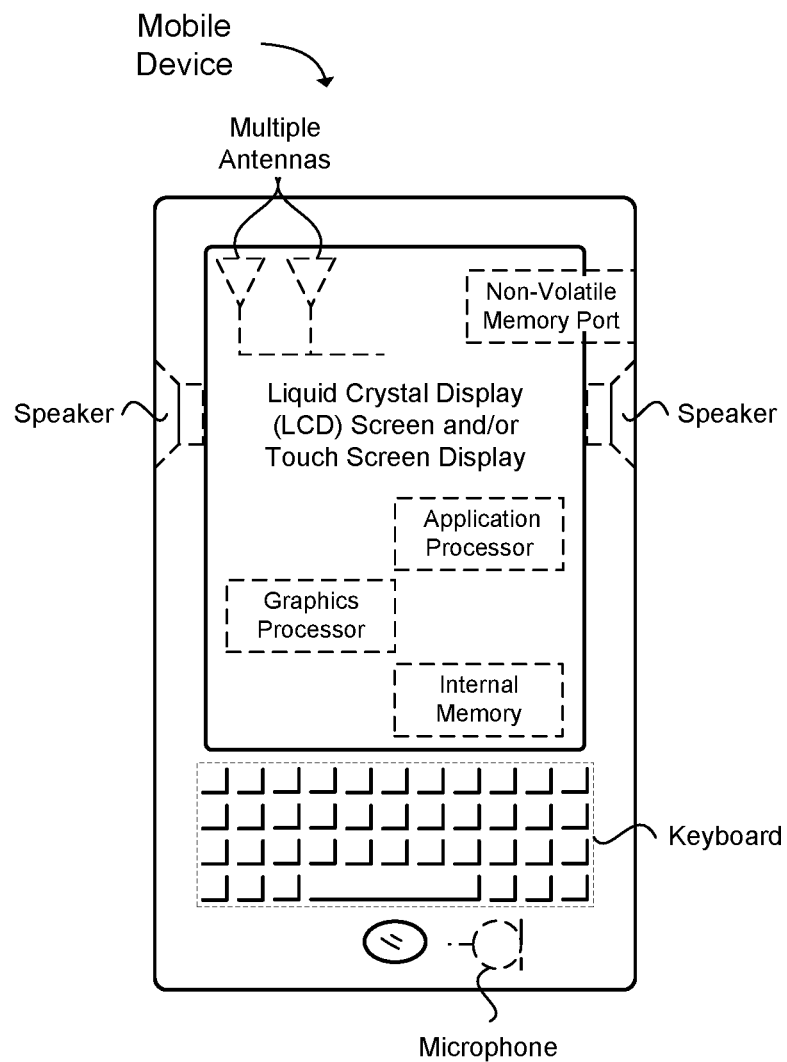
FIG. 5 illustrates a wireless device in accordance with an example.

FIG. 5 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 5 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater, comprising: a first coaxial cable with a first defined connection; a repeater unit communicatively coupled to the first coaxial cable via the first defined connection; and a controller configured to adjust a gain or output power of the repeater unit that accounts for known losses on the first coaxial cable.

Example 2 includes the repeater of Example 1, further comprising: a second coaxial cable with a second defined connection, wherein the repeater unit is communicatively coupled to the second coaxial cable via the second defined connection, and the controller is further configured to adjust a gain or output power of the repeater unit that accounts for known losses on the second coaxial cable.

Example 3 includes the repeater of any of Examples 1 to 2, further comprising: a first antenna communicatively coupled to the first coaxial cable via a first coaxial cable connection; and a second antenna communicatively coupled to a second coaxial cable via a second coaxial cable connection.

Example 4 includes the repeater of any of Examples 1 to 3, wherein the controller is further configured to adjust the gain or output power of the repeater unit based on a gain or output power measurement between: a first coaxial cable connector communicatively coupling a first antenna and the first coaxial cable, and a second coaxial cable connector communicatively coupling a second antenna and a second coaxial cable, thereby accounting for the known losses on the first coaxial cable and the known losses on the second coaxial cable when adjusting the gain or output power of the repeater unit.

Example 5 includes the repeater of any of Examples 1 to 4, wherein the controller is further configured to adjust the gain or output power of the repeater unit based on a system gain or received power that considers the first coaxial cable, the repeater unit and a second coaxial cable.

Example 6 includes the repeater of any of Examples 1 to 5, wherein the controller is further configured to determine an optimum gain or output power of the repeater unit depending on: a known insertion loss associated with the first coaxial cable, or a known length and type associated with the first coaxial cable.

Example 7 includes the repeater of any of Examples 1 to 6, wherein: the first defined connection includes a first defined connector that is preconfigured based on: an insertion loss of the first coaxial cable, or a length and type of the first coaxial cable.

Example 8 includes the repeater of any of Examples 1 to 7, wherein the first defined connection includes a defined connector with a non-standard diameter or a non-standard threading gauge or reverse/non-standard polarity.

Example 9 includes the repeater of any of Examples 1 to 8, the first defined connection includes a standard connector or a non-standard connector that is included within the repeater unit and inaccessible to a user, or the first defined connection is a direct connection to a printed circuit board (PCB).

Example 10 includes the repeater of any of Examples 1 to 9, wherein the repeater unit includes: a first signal path communicatively coupled to the first coaxial cable via the first defined connection; and a second signal path communicatively coupled to the second coaxial cable via the second defined connection.

Example 11 includes the repeater of any of Examples 1 to 10, wherein the repeater unit includes: one or more downlink signal paths for amplification and filtering of downlink signals; and one or more uplink signal paths for amplification and filtering of uplink signals.

Example 12 includes the repeater of any of Examples 1 to 11, wherein: the first antenna is an inside antenna that is configured to communicate with a mobile device; and the second antenna is an outside antenna that is configured to communicate with a base station.

Example 13 includes the repeater of any of Examples 1 to 12, wherein the controller is configured to adjust the gain or output power of the repeater unit to meet a network protection or government standard.

Example 14 includes the repeater of any of Examples 1 to 13, further comprising a circuit configured to: determine an expected minimum return loss or insertion loss on a donor unit server port of the repeater; and shut down the repeater unit when the expected minimum return loss or insertion loss is not present.

Example 15 includes the repeater of any of Examples 1 to 14, wherein the repeater unit and the first coaxial cable are certifiable as a system to meet a network protection or government standard.

Example 16 includes a signal boosting system, comprising: a first signal booster unit with a first defined connection; a coaxial cable that is communicatively coupled to the first signal booster unit via the first defined connection; and at least one controller configured to adjust a gain or output power of the signal boosting system that accounts for known losses on the coaxial cable that is communicatively coupled to the first signal booster unit.

Example 17 includes the signal boosting system of Example 16, further comprising a second signal booster unit with a second defined connection, wherein the coaxial cable is communicatively coupled to the second signal booster unit via a second defined connection, wherein the at least one controller is configured to adjust the gain or output power of the signal boosting system that accounts for known losses on the coaxial cable that is communicatively coupled to the second signal booster unit.

Example 18 includes the signal boosting system of any of claims 16 to 17, further comprising: a first antenna communicatively coupled to the first signal booster unit via a first coaxial cable connection over a first antenna coaxial cable.

Example 19 includes the signal boosting system of any of claims 16 to 18, wherein the at least one controller is further configured to adjust the gain or output power of the signal boosting system based on a gain and or power measurement between: a first coaxial cable connector communicatively coupling a first antenna and the first signal booster unit, and a second coaxial cable connector communicatively coupling a second antenna and a second signal booster unit, thereby accounting for the known losses on the coaxial cable that is communicatively coupled to the first signal booster unit and the second signal booster unit when adjusting the gain or output power of the signal booster.

Example 20 includes the signal boosting system of any of claims 17 to 19, wherein the controller is further configured to adjust the gain or output power of the signal boosting system between the first signal booster unit and a second signal booster unit, thereby accounting for system performance of: the first signal booster unit, the second signal booster unit, and the coaxial cable that is communicatively coupled to the first signal booster unit and the second signal booster unit, when adjusting the gain or output power of the signal boosting system.

Example 21 includes the signal boosting system of any of claims 17 to 20, wherein: the first defined connection includes a first defined connector that is preconfigured based on: an insertion loss of the coaxial cable, or a length and type of the coaxial cable.

Example 22 includes the signal boosting system of any of claims 17 to 21, wherein the first defined connection includes a defined connector with a non-standard diameter or a non-standard threading gauge or reverse/non-standard polarity.

Example 23 includes the signal boosting system of any of claims 17 to 22, wherein: the first signal booster unit includes one or more amplifiers and one or more filters for amplification and filtering of signals.

Example 24 includes the signal boosting system of any of claims 17 to 23, wherein the at least one controller includes a first controller configured to adjust a gain or output power for the first signal booster unit and a second controller configured to adjust a gain or output power for a second signal booster unit.

Example 25 includes the signal boosting system of any of claims 17 to 24, wherein the at least one controller is configured to adjust the gain or output power of the signal boosting system to meet a network protection or government standard.

Example 26 includes a repeater, comprising: a repeater unit having a first port and a second port, wherein the first port is operable to be connected only with a first selected coaxial cable, the first selected coaxial cable having a first coaxial connector operable to connect with the first port and a second coaxial connector, wherein the repeater is configured to have a system gain or output power based on known losses on the first selected coaxial cable.

Example 27 includes the repeater of Example 26, wherein the second port is operable to be connected only with a second selected coaxial cable, the second selected coaxial cable having a first coaxial connector operable to connect with the second port and a second coaxial connector.

Example 28 includes the repeater of any of Examples 26 to 27, wherein the repeater is configured to have the system gain or output power based on known losses between the second coaxial connector of the first selected coaxial cable and the second coaxial connector of the second selected coaxial cable to enable a loss of the first selected coaxial cable and a loss of the second selected coaxial cable to be accounted for in the system gain.

Example 29 includes the repeater of any of Examples 26 to 28, wherein the system gain is based on the known losses between the second coaxial connector of the first selected coaxial cable and the second coaxial connector of the second selected coaxial cable according to a requirement of a regulatory body for a cellular consumer signal booster.

Example 30 includes the repeater of any of Examples 26 to 29, wherein the repeater is configured to have the system gain set depending on a length of the first selected coaxial cable and a length of the second selected coaxial cable.

Example 31 includes a repeater, comprising: a repeater unit having a first port and a second port; a first coaxial cable fixedly connected with the first port, wherein a gain or output power of the repeater accounts for known losses on the first coaxial cable.

Example 32 includes the repeater of Example 31, further comprising a second coaxial cable fixedly connected with the second port, wherein the gain or output power of the repeater accounts for known losses on the second coaxial cable.

Example 33 includes the repeater of any of Examples 31 to 32, wherein the gain or output power of the repeater is adjusted based on a gain or output power measurement that considers the first coaxial cable, the repeater unit and a second coaxial cable.

Example 34 includes the repeater of any of Examples 31 to 33, wherein the gain or output power of the repeater unit is adjusted depending on a length of the first coaxial cable.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater, comprising:
   a first defined connection;
   a second defined connection;
   a first coaxial cable connector configured to be communicatively coupled to the first defined connection;
   a second coaxial cable connector configured to be communicatively coupled to the second defined connection;
   a repeater unit communicatively coupled to the first defined connection and the second defined connection; and
   a controller configured to set a gain or output power of the repeater unit to compensate for set cable losses between the first coaxial cable connector and the first defined connection and the second coaxial cable connector and the second defined connection, wherein the set cable losses are at a selected frequency or frequency range.

2. The repeater of claim 1, wherein the controller is further configured to set the gain or output power of the repeater unit based on a gain or output power measurement between the first coaxial cable connector and the second coaxial cable connector.

3. The repeater of claim 1, further comprising:
   a first antenna communicatively coupled to the first coaxial cable connector; and
   a second antenna communicatively coupled to the second coaxial cable connector.

4. The repeater of claim 1, wherein the cable losses includes a first loss between the first coaxial cable connector and the first defined connection and a second loss between the second coaxial cable connector and the second defined connection.

5. The repeater of claim 1, wherein the repeater unit includes:
   one or more downlink signal paths between the first defined connection and the second defined connection, the one or more downlink signal paths for amplification and filtering of downlink signals; and
   one or more uplink signal paths between the first defined connection and the second defined connection, the one or more uplink signal paths for amplification and filtering of uplink signals.

6. The repeater of claim 1, wherein the controller is further configured to set the gain or output power of the repeater unit based on a system gain, wherein the system gain is based on the cable losses between the first coaxial cable connector and the first defined connection and the second coaxial cable connector and the second defined connection according to a requirement of a regulatory body for a cellular consumer repeater.

7. The repeater of claim 1, wherein the repeater unit is certifiable as a system to meet a network protection or government standard.

8. A repeater, comprising:
   a first duplexer;
   a second duplexer;
   a first coaxial cable connector other than a first defined connection, the first coaxial cable connector configured to be communicatively coupled to the first duplexer;
   a second coaxial cable connector other than a second defined connection, the second coaxial cable connector configured to be communicatively coupled to the second duplexer;
   a repeater unit communicatively coupled to the first coaxial cable connector and the second coaxial cable connector; and
   a controller configured to set a gain or output power of the repeater unit that compensates for set cable losses between the first coaxial cable connector and the first duplexer and the second coaxial cable connector and the second duplexer, wherein the set cable losses are at a selected frequency or frequency range.

9. The repeater of claim 8, wherein the controller is further configured to set the gain or output power of the repeater unit based on a gain or output power measurement between the first coaxial cable connector and the second coaxial cable connector.

10. The repeater of claim 8, further comprising:
a first antenna communicatively coupled to the first coaxial cable connector; and
a second antenna communicatively coupled to the second coaxial cable connector.

11. The repeater of claim 8, further comprising one or more of:
the first defined connection; or
the second defined connection,
wherein the repeater unit is coupled to the first defined connection or the second defined connection.

12. The repeater of claim 8, wherein the cable losses includes a first loss between the first coaxial cable connector and the first duplexer and a second loss between the second coaxial cable connector and the second duplexer.

13. The repeater of claim 8 wherein the repeater unit includes:
one or more downlink signal paths between the first coaxial cable connector and the second coaxial cable connector, the one or more downlink signal paths for amplification and filtering of downlink signals; and
one or more uplink signal paths between the first coaxial cable connector and the second coaxial cable connector, the one or more uplink signal paths for amplification and filtering of uplink signals.

14. The repeater of claim 8, wherein the controller is further configured to set the gain or output power of the repeater unit based on a system gain, wherein the system gain is based on the cable losses between the first coaxial cable connector and the first duplexer and the second coaxial cable connector and the second duplexer according to a requirement of a regulatory body for a cellular consumer repeater.

15. The repeater of claim 8, wherein the repeater unit is certifiable as a system to meet a network protection or government standard.

16. A repeater, comprising:
a first defined connection;
a first coaxial cable connector configured to be communicatively coupled to the first defined connection;
a repeater unit communicatively coupled to the first defined connection; and
a controller configured to set a gain or output power of the repeater unit that compensates for set cable losses between the first coaxial cable connector and the first defined connection, wherein the set cable losses are at a frequency or frequency range.

17. The repeater of claim 16, further comprising:
a second defined connection; and
a second coaxial cable connector configured to be communicatively coupled to the second defined connection,
wherein the repeater unit is communicatively coupled to the second defined connection,
wherein the controller is configured to set a gain or output power of the repeater unit that compensates for cable losses between the second coaxial cable connector and the second defined connection.

18. The repeater of claim 16, wherein the controller is further configured to set the gain or output power of the repeater unit based on a gain or output power measurement between the first coaxial cable connector and the first defined connection.

19. The repeater of claim 16, wherein the cable losses includes a loss between the first coaxial cable connector and the first defined connection.

20. The repeater of claim 16, wherein the controller is further configured to set the gain or output power of the repeater unit based on a system gain, wherein the system gain is based on the cable losses between the first coaxial cable connector and the first defined connection according to a requirement of a regulatory body for a cellular consumer repeater.

* * * * *